United States Patent [19]

Kilger

[11] Patent Number: 5,592,567

[45] Date of Patent: Jan. 7, 1997

[54] METHOD FOR DETECTING AND SEPARATING THE SHADOW OF MOVING OBJECTS IN A SEQUENCE OF DIGITAL IMAGES

[75] Inventor: Michael Kilger, Ergoldsbach, Germany

[73] Assignee: Siemens Aktiengesellschaft, Munich, Germany

[21] Appl. No.: 416,838

[22] PCT Filed: Nov. 2, 1993

[86] PCT No.: PCT/DE93/01043

§ 371 Date: May 10, 1995

§ 102(e) Date: May 10, 1995

[87] PCT Pub. No.: WO94/11852

PCT Pub. Date: May 26, 1994

[30] Foreign Application Priority Data

Nov. 10, 1992 [DE] Germany ............................ 42 37 906.7

[51] Int. Cl.$^6$ .................................................. G06K 9/00
[52] U.S. Cl. ........................................... 382/199; 382/203
[58] Field of Search ...................................... 382/103, 170, 382/283, 107, 104, 168, 169, 171, 172, 199, 203; 348/169, 571, 586, 576, 416, 578, 579, 671, 672, 135, 148, 149; 395/126, 133, 134, 118, 120, 121, 135; 340/942, 937, 903, 435, 933, 938

[56] References Cited

U.S. PATENT DOCUMENTS

| | | | |
|---|---|---|---|
| 3,760,377 | 9/1973 | Attridge et al. | 382/103 |
| 4,433,325 | 2/1984 | Tanaka et al. | 340/937 |
| 4,954,962 | 9/1990 | Evans, Jr. et al. | 364/513 |
| 5,099,324 | 3/1992 | Abe | 558/108 |
| 5,293,235 | 3/1994 | Guede et al. | 348/586 |
| 5,410,346 | 4/1995 | Saneyoshi et al. | 348/116 |
| 5,410,418 | 4/1995 | Yonezawa | 358/456 |
| 5,428,723 | 6/1995 | Ainscow et al. | 395/135 |

FOREIGN PATENT DOCUMENTS 0224253  3/1987  European Pat. Off. ............... 382/181

OTHER PUBLICATIONS

"Measurement of Two–Dimensional Movement of Traffic by Image Processing", Kobatake et al., IEEE Proceedings: ICASSP 87 International Conference on Acoustics, Speech & Signal Processing, Apr. 6–9, 1987, pp. 614–617.

"Detection Et Suivi D'Objets Par Analyse De Sequences D'Images", Pineau et al., Treizieme Colloque Sur Le Traitement Du Signal Et Des Images Juan–Les–Pins, Sep. 16–20, 1991, pp. 1125–1128.

(List continued on next page.)

*Primary Examiner*—Jose L. Couso
*Assistant Examiner*—Bijan Tadayon
*Attorney, Agent, or Firm*—Hill, Steadman & Simpson

[57] ABSTRACT

For detecting and separating the shadow of moving objects in a sequence of digital images, a sequence of background images is first determined from a sequence of images, this sequence of background images containing only the non-moving image background of the sequence of images but not the moving objects. Object edges are then extracted from the sequence of images in that in each case an edge gray-value image is determined for each image of the sequence of images and for each respective corresponding background image of the sequence of background images. Using vertical or horizontal projection of these edge gray-value images, corresponding vertical or horizontal edge histograms are determined in each case for the edge gray-value images. Edges which do not belong to moving objects or shadows of moving objects are eliminated, in that the edge histograms of a background image are subtracted from the corresponding edge histograms of the image, belonging to the same instant, of the sequence of images and in that the differential edge histograms formed in this manner are subjected to a threshold value discrimination, by which means those edges are eliminated which do not correspond to the actual moving objects but rather to a shadow of a moving object.

6 Claims, 8 Drawing Sheets

OTHER PUBLICATIONS

"Optical Sensing and Size Discrimination of Moving Vehicles Using Photocell Array and Threshold Devices", Tasuku Takagi, IEEE Transactions on Instrumentation and Measurement, vol. 25, No. 1, Mar. 1976, pp. 52–55.

"Moving Object Segmentation Based on Adaptive Reference Images", Karmann et al., Proceedings of Eusipco, Barcelona, Spain, Sep. 18–21, 1990, pp. 951–954.

"A Video–Based System for Extracting Traffic Flow Parameters", W. Feiten et al., Proceedings from 13th DAGM Symposium, Munich, Oct. 9–11, 1991, pp. 507–514.

METHOD FOR DETECTING AND SEPARATING THE SHADOW OF MOVING OBJECTS IN A SEQUENCE OF DIGITAL IMAGES

BACKGROUND OF THE INVENTION

In the processing of sequences of digital images from highway traffic scenes for the purposes of detection, tracking and classification of vehicles, there is often the disturbing effect that the vehicles throw a shadow on the highway in the event of there being direct sunshine, the shadow not being able to be separated in a simple way from the vehicle. As a result, a classification of vehicles according to their geometrical dimensions, in particular according to their width, is often made more difficult, if not impossible.

Previous approaches to solving this problem fall back on vehicle models (G. D. Sullivan, K. D. Baker: Model-based vision: using cues to select hypotheses. SPIE Vol. 654 Automatic Optical Inspection (1986), pp. 272–277), which are brought into coincidence with the image (matching), as a result of which separating the shadow is not necessary. This approach has the disadvantage, however, that it is very computation-intensive and that, given the present state of development of image processing hardware, an implementation of such methods in real time within a useful cost frame does not appear possible.

SUMMARY OF THE INVENTION

The present invention is therefore based on the object of specifying a method for detecting and separating the shadow of moving objects in a sequence of digital images, which is suitable for application in the above-mentioned image processing methods and which can be implemented in real time on the basis of cost-effective hardware modules. According to the invention, this object is achieved by a method for detecting and separating the shadow of moving objects in a sequence of digital images having the following steps.

In this method, a sequence of background images is first determined from a sequence of images, the sequence of background images containing only the non-moving image background of the sequence of images but not the moving objects. Object edges are then extracted from the sequence of images, in that, for each image of the sequence of images and for the respective corresponding background image of the sequence of background images, in each case an edge gray-value image is determined. By means of vertical or horizontal projection of the edge gray-value images, corresponding vertical or horizontal edge histograms are determined in each case for the edge gray-value images. Edges which do not belong to moving objects or shadows of moving objects are eliminated, in that the edge histograms of a background image are subtracted from the corresponding edge histograms of the image, belonging to the same instant, of the sequence of images and in that the differential edge histograms formed in this manner are subjected to a threshold value discrimination, by which means those edges are eliminated which do not correspond to the actual moving objects but rather to a shadow of a moving object.

To carry out this method, an essentially smaller computational cost is necessary than in the case of matching of object models to image regions.

In a preferred embodiment of the invention, the edge gray-value images are put into binary form before the determination of the edge histograms. By means of this measure, the computational cost in the processing of the edge histograms can be further reduced.

A further reduction of the computational cost becomes possible if, before carrying out the steps of extracting object edgesn1, those image regions are determined which correspond to moving objects - if appropriate including their shadow - and in which the remaining steps are applied only to these image regions.

In a further preferred embodiment of the method according to the invention, edge histograms which belong to one and the same moving object are combined into a time sequence of edge histograms and the elimination of shadow edges is improved by means of an identification of edges corresponding to each other.

In a further preferred embodiment of the method, the elimination of the shadow edges is improved further in that preknowledge about the lateral position of the shadow edges with reference to the object edges is used. This preknowledge can preferably be learned and continuously checked by detecting the lateral position of the shadow edges in an adaptive manner from the sequence of images. By means of this measure, the practicality and robustness of the method according to the invention can be further improved.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

The invention will be explained in more detail in the following text, by means of preferred exemplary embodiments and with the aid of the figures.

Figure 4:
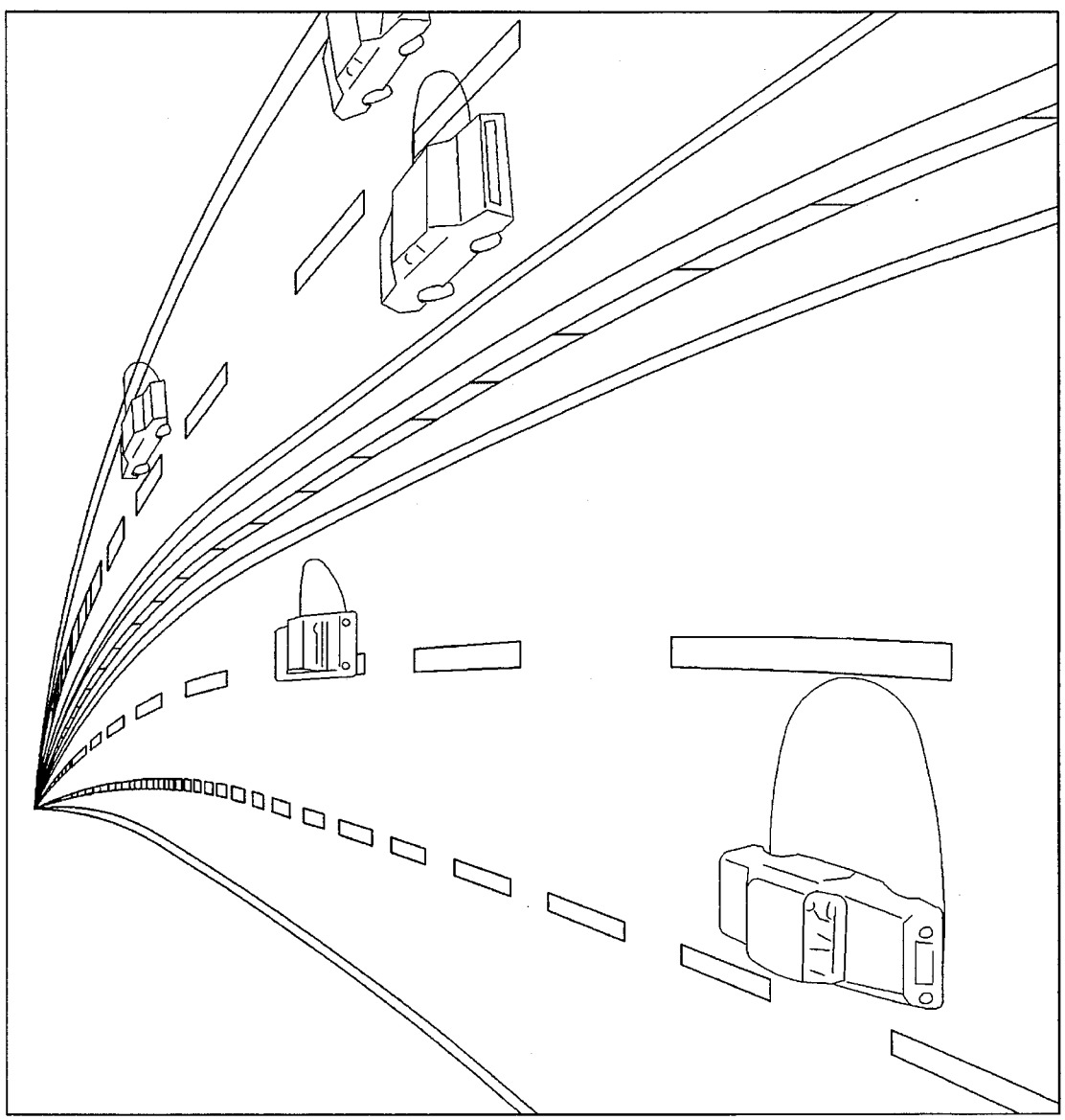
FIG. 4 shows an example of an image of the sequence of images.
Figure 5:
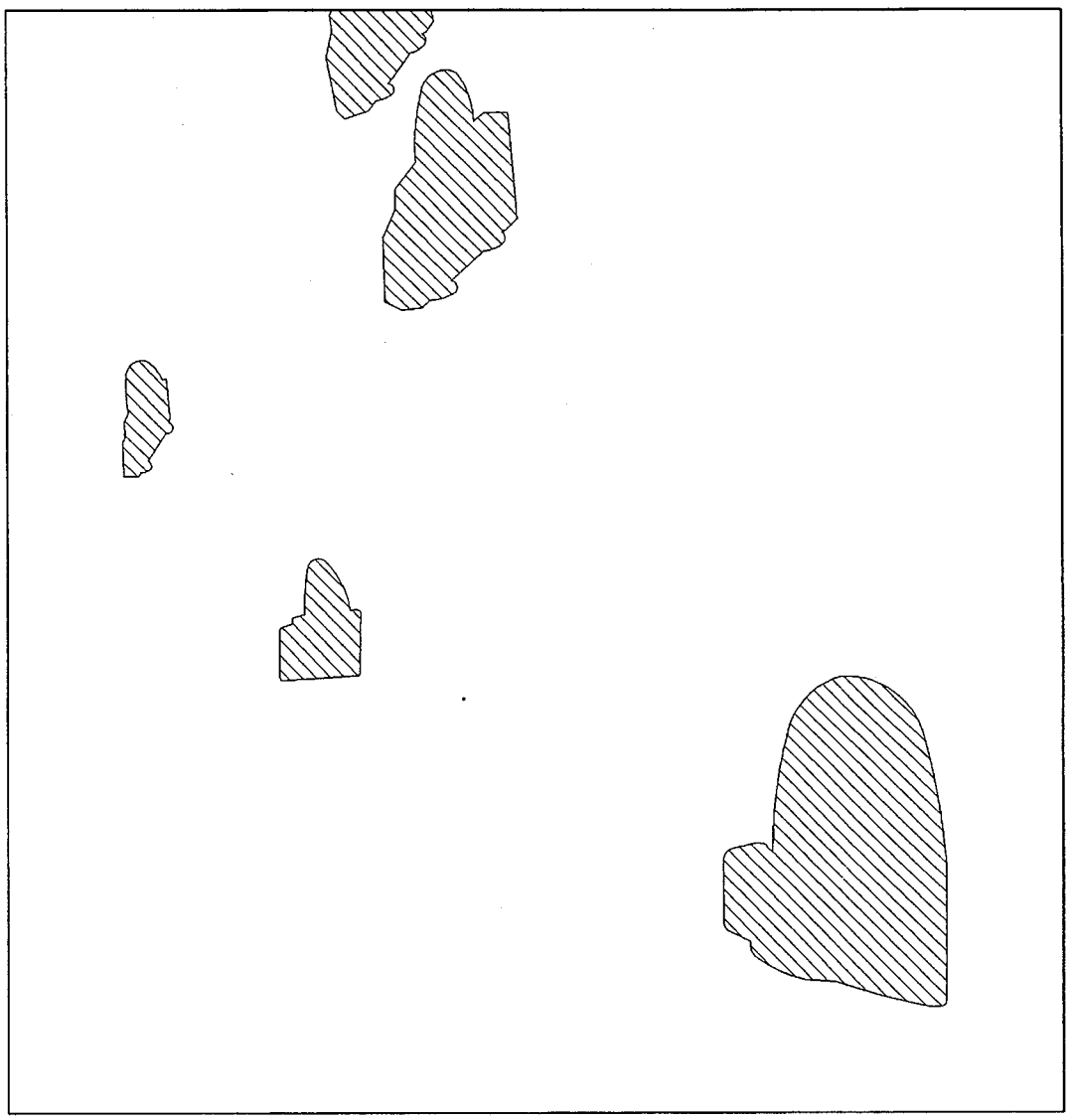
FIG. 5 shows an example of a moving object image, in which the moving objects are visible as black areas.
Figure 6:
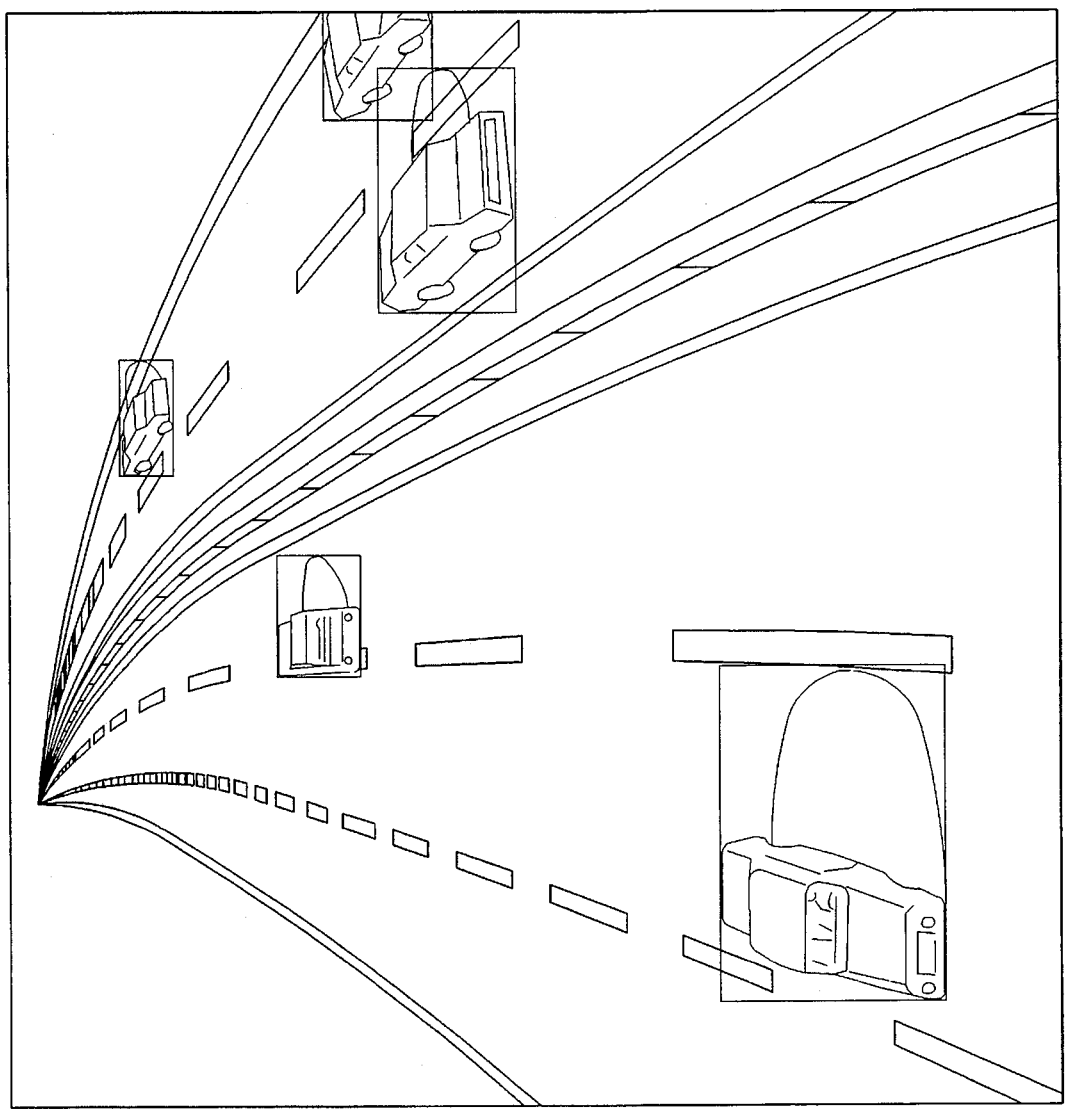
FIG. 6 shows the marking of moving objects, including their shadow, by means of including rectangles within one image of the sequence of images.

Shown in FIG. 4 is a typical highway traffic scene at a specific instant, as it is recorded by a camera which is erected (for example on a bridge above the highway). Because of the sunlight, incident laterally from the left in this case, the moving objects throw a distinctly recognizable shadow to their right side onto the highway. The fact that this shadow has a disturbing effect on the determination of the geometrical dimensions, especially of the width of the moving objects, is shown in particular by a glance at FIG. 5, in which the moving objects, including their shadows, are shown as black markings in the image plane. FIG. 6 shows the including rectangles, of the moving objects, resulting from these conditions, including their shadows, which lead to considerable overestimates of the dimensions of the moving objects.

From various publications (W. Feiten et al.: A video-based system for extracting traffic flow parameters, Proc. 13th DAGM 1991, Munich, pp. 507–514; K. P. Karmann, A. v. Brandt: Moving object segmentation based on adaptive reference images, Proc. of EUSIPCO 1990, Barcelona), methods for determining sequences of background images belonging to sequences of images are known. These sequences of background images have the property that moving objects which are contained in the original sequence of images are not contained in said sequence of background images.

Figure 7:
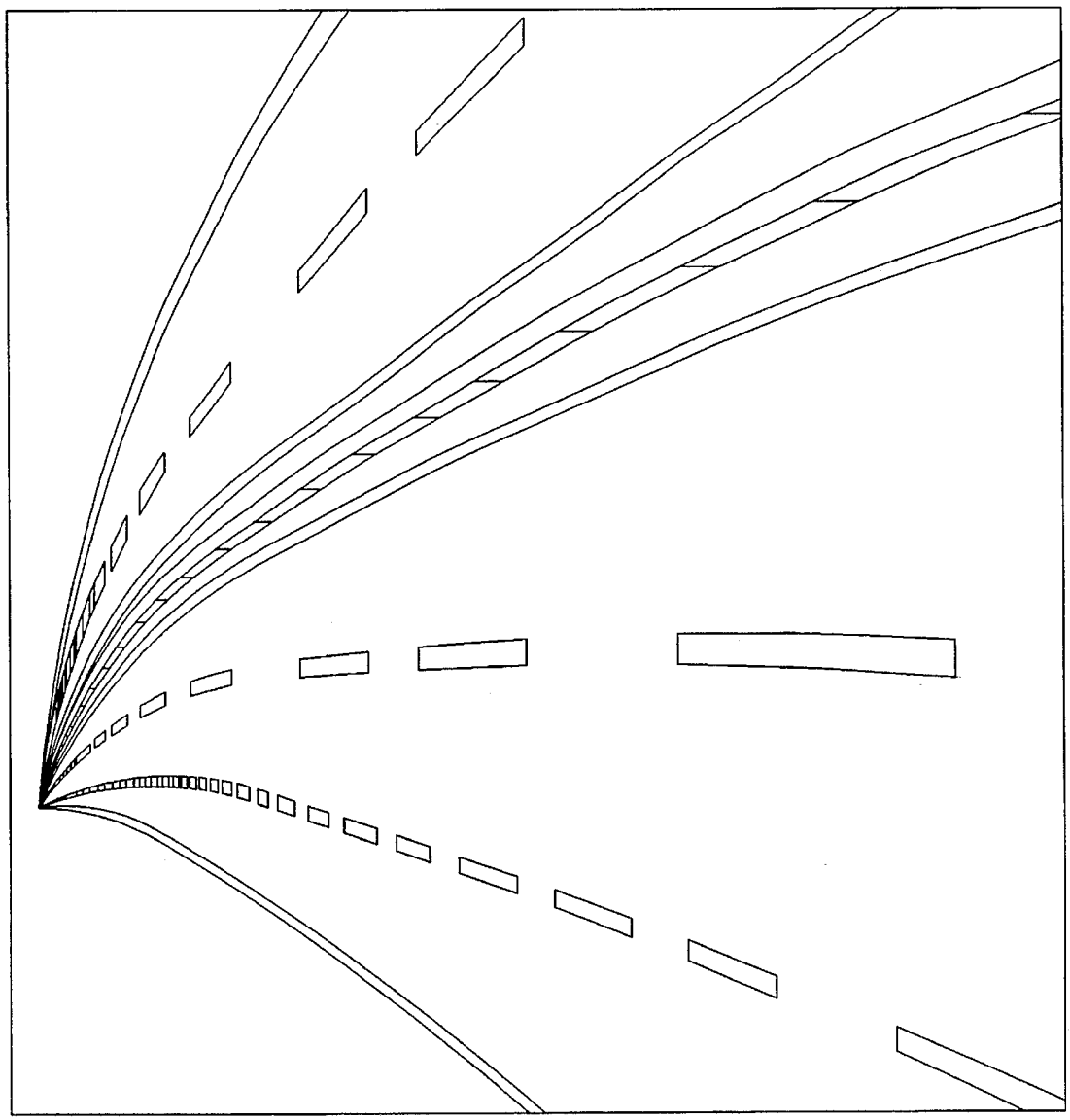
FIG. 7 shows a background image belonging to the sequence of images considered.
Figure 8:
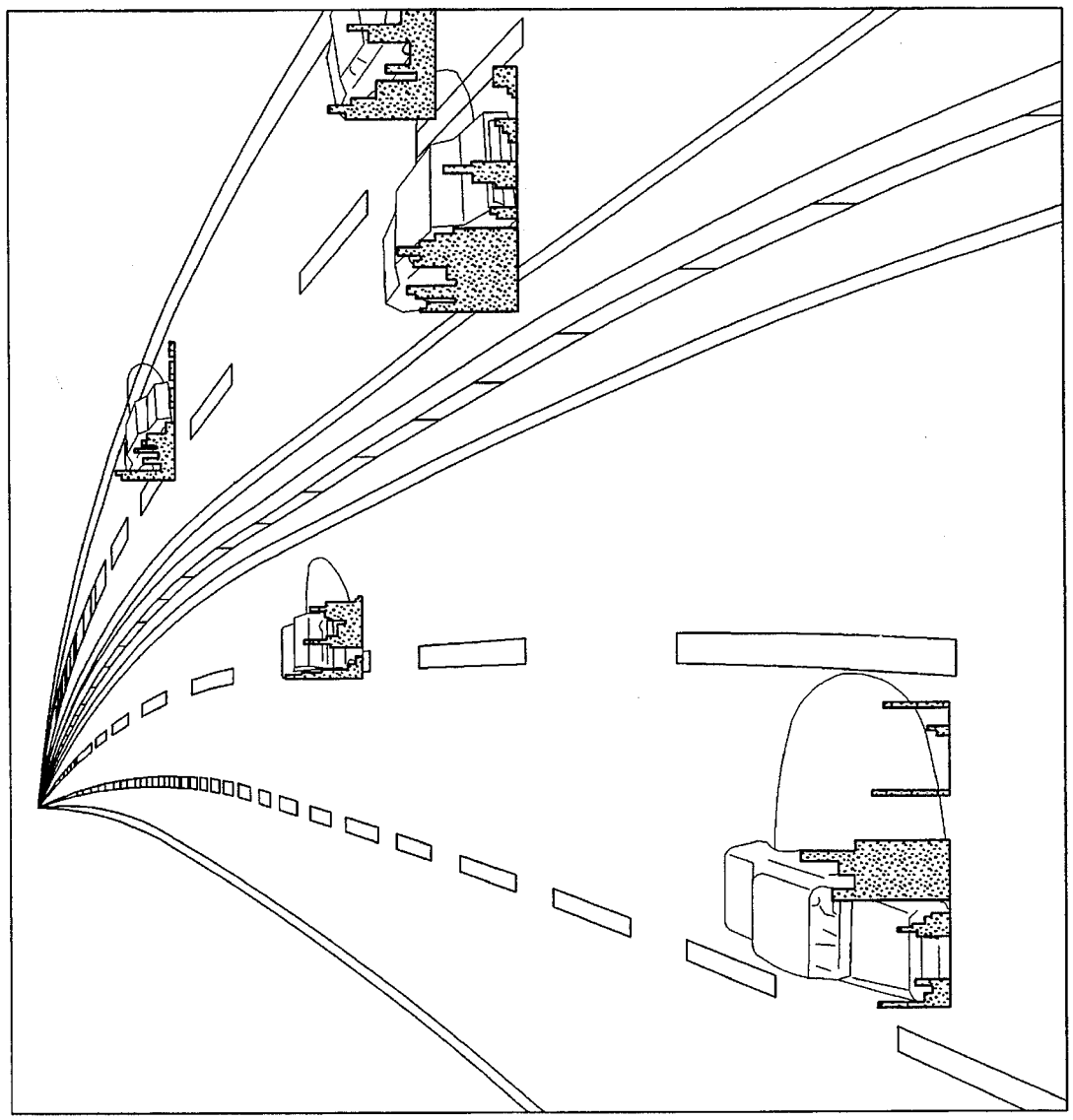
FIG. 8 shows an image with the assignment of the vertical histograms to the moving objects.
Figure 9:
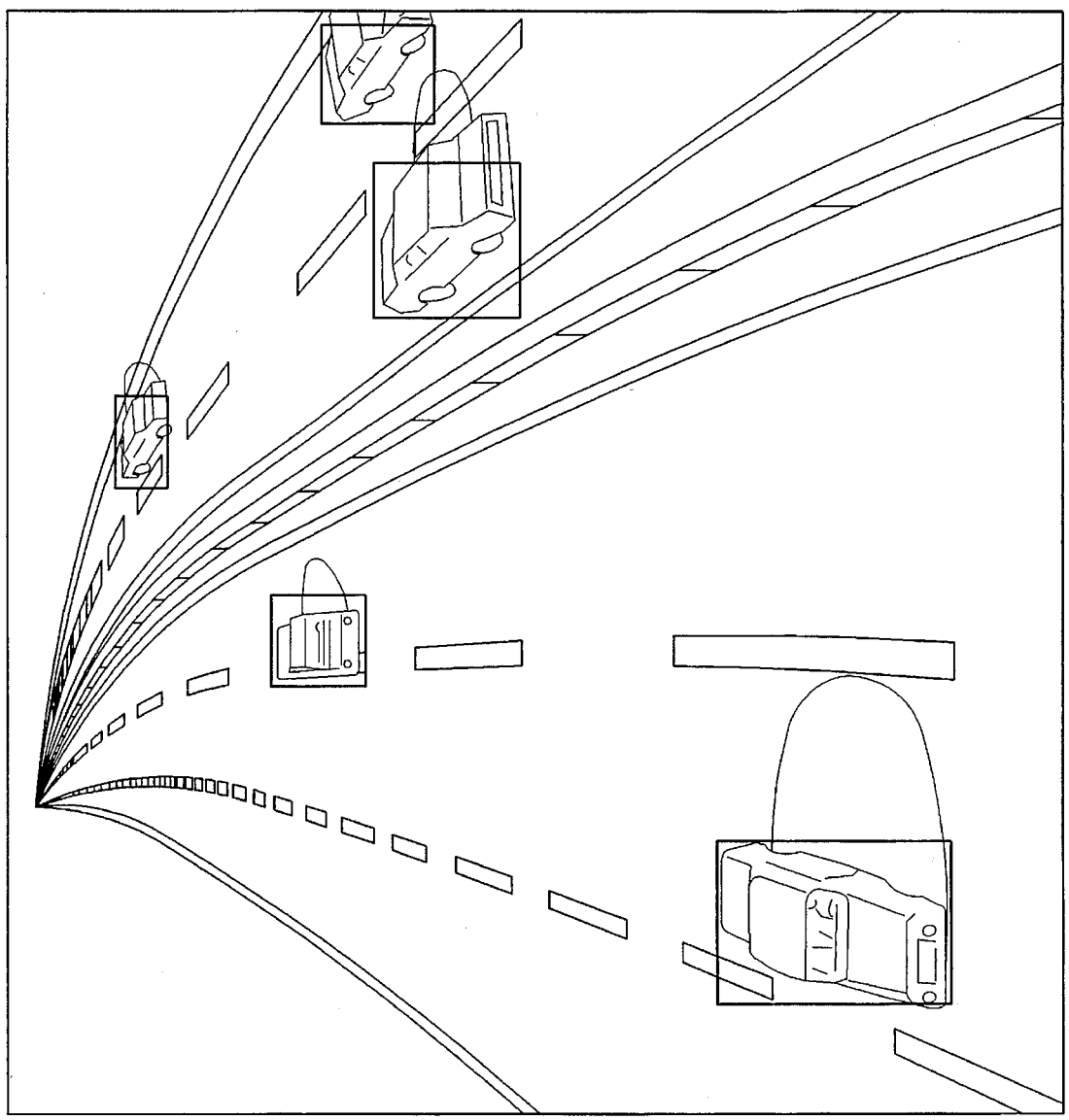
FIG. 9 shows the marking of moving objects with the exclusion of their shadow by means of including rectangles in an image of the sequence of images.

FIG. 7 shows a background image belonging to the sequence of images represented by FIG. 4. Such a background image is calculated in an adaptive manner from the original sequence of images, as a result of which all slowly varying changes of the original sequence of images are also contained in the sequence of background images. The calculation of such sequences of background images is known from the literature and thus represents no particular technical problem in connection with the present invention. As can be seen from FIGS. 4, 5 and 6, however, not only are the moving objects eliminated from the sequence of background images, but also, if present, the shadows belonging to these objects, thrown in this case onto the highway. For this reason, these shadows, and not just the actual moving objects, are also contained in the object images generated by means of the formation of differences from the sequence of images and the sequence of background images. In order to separate said shadows from the actual moving objects, according to the invention, an edge gray-value image is now calculated for each image of the sequence of images and also for each corresponding image of the sequence of background images, using known methods which are described in the literature. A series of classical methods for the extraction of edges from sequences of digital images is described in the book by Y. Shirai, Three-Dimensional computer vision, Springer Verlag, 1987, especially on pages 32 ff. The calculation of edge gray-value images thus represents no technical problem in connection with the present invention.

Figure 1:
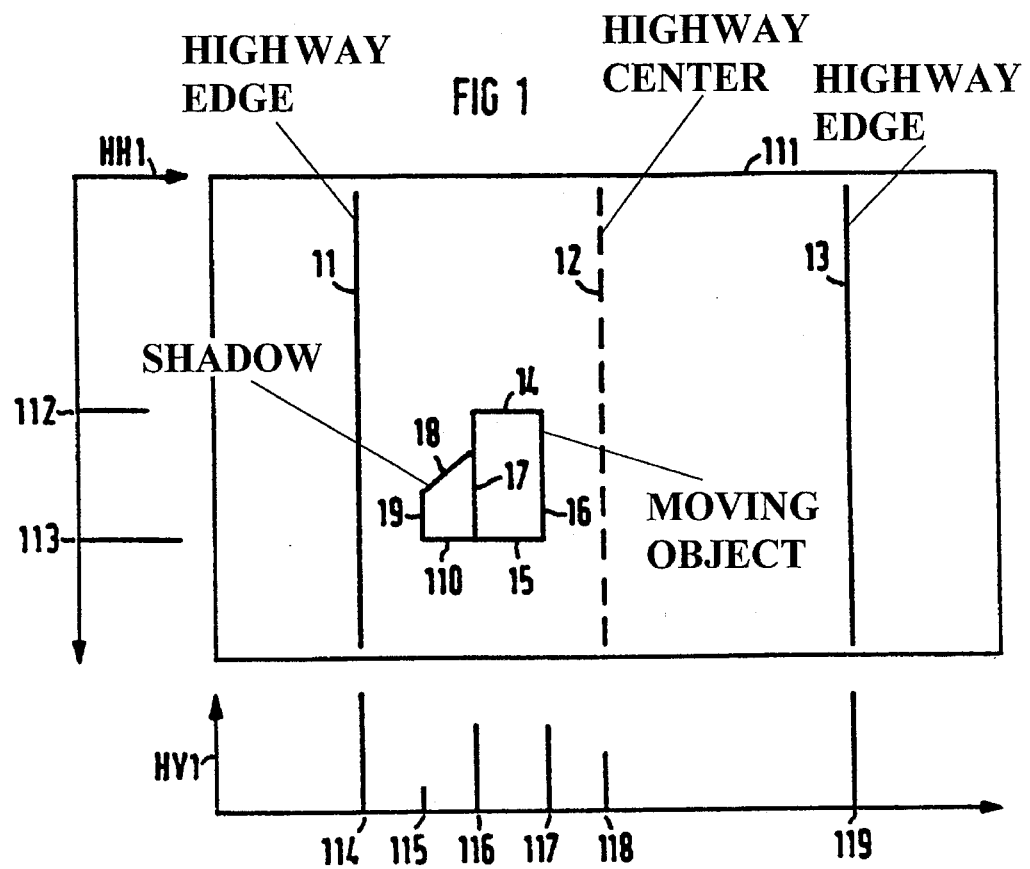
FIG. 1 shows in schematic form an edge gray-value image of an image from the sequence of images, with the associated vertical and horizontal edge histograms.

FIG. 1 shows the typical course of the edges in an image of the sequence of images from a highway traffic scene. The edges 11, 12 and 13 mark the edges of the highway and the highway center, respectively, the edges 14 to 17 mark a moving object on the left highway and the edges 18, 19 and 110 mark the edges of the thrown shadow belonging to the object. The associated horizontal (HH1) and vertical (HV1) edge histograms are shown below and to the left, respectively, beside the schematically represented edge gray-value image. Edge histograms of this type are determined from the edge gray-value image using standard methods, which are entirely familiar to those skilled in the art in the field of image processing and therefore require no further representation in connection with the present invention. These edge histograms are determined by means of vertical or horizontal projection of the edge gray-value image, that is to say by summing the gray values along the corresponding rows and columns of the digital image.

Figure 2:
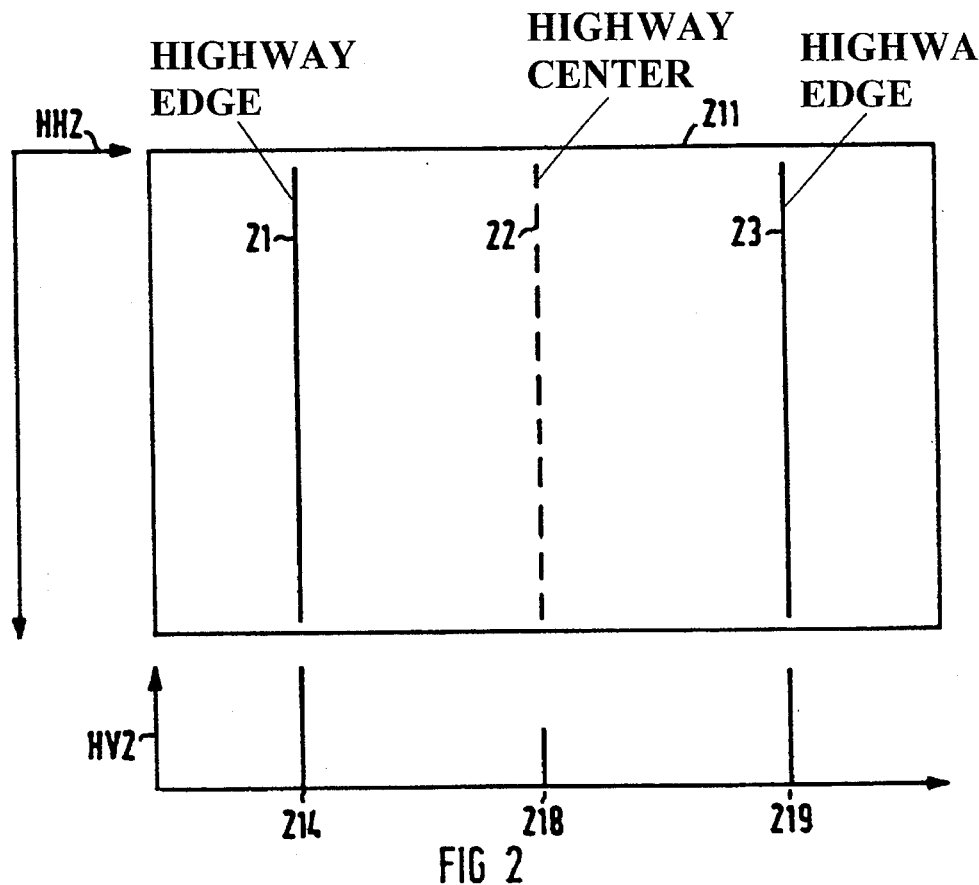
FIG. 2 shows an edge gray-value image belonging to a background image, with the associated horizontal and vertical edge histograms.

FIG. 2 shows in a schematic way the edge gray-value image of the corresponding background image, in which only the edges of the highway edge markings and of the highway center are to be seen, but not the edges of the moving object and its shadow. Correspondingly, the associated edge histograms contain few lines or even no lines at all.

Figure 3:
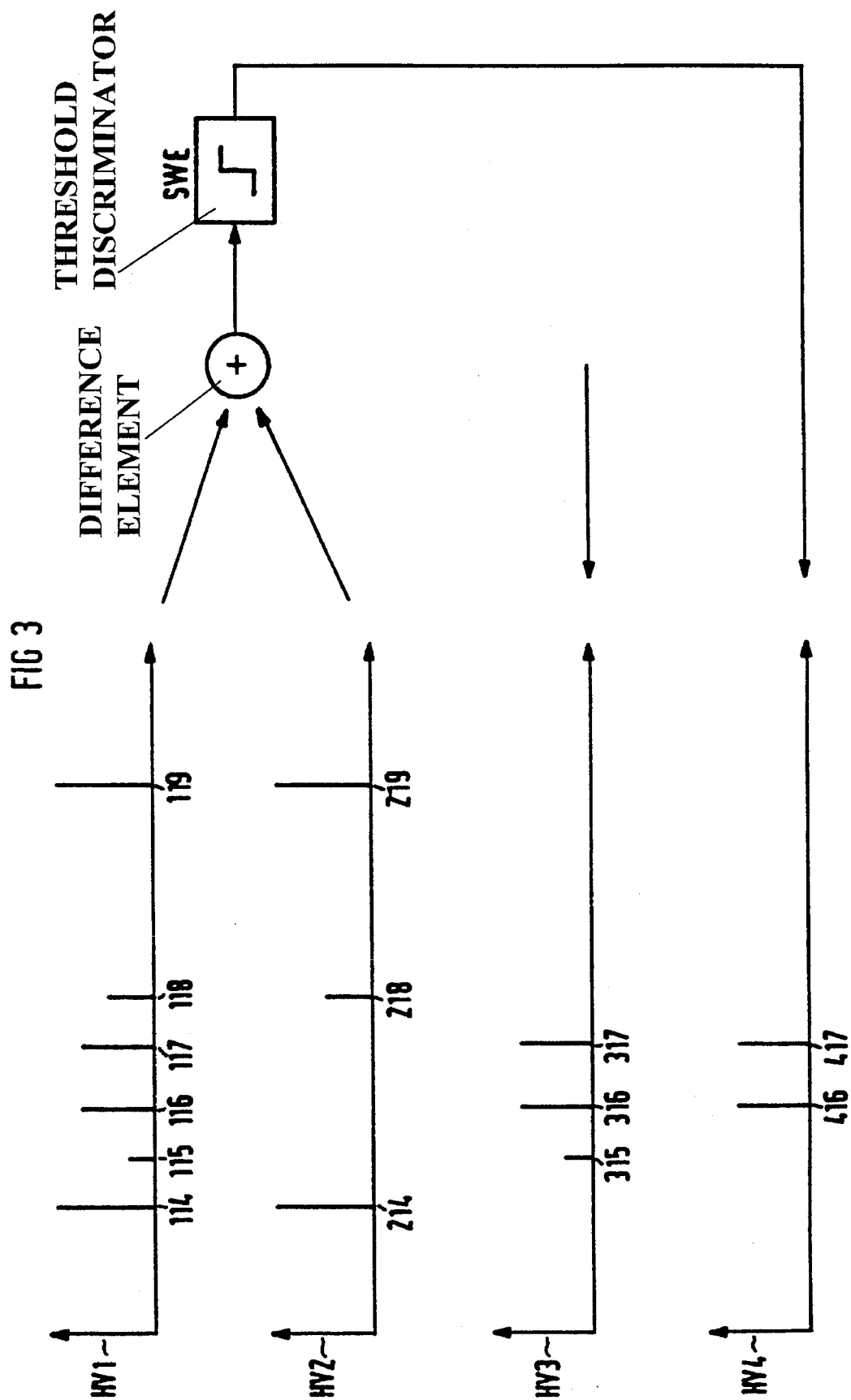
FIG. 3 shows schematically the relationship between the edge histograms of the image of the sequence of images and of the background image with the differential edge histogram and the edge histogram determined by means of threshold value discrimination, using the example of vertical edge histograms.

FIG. 3 then shows, using the example of vertical histograms, how the histograms shown in FIGS. 1 and 2 are subtracted from each other and are subjected to a threshold value discrimination, as a result of which the histograms HV3 and HV4, respectively, shown in FIG. 3, are formed. The histogram HV3 contains only the edges of the moving object and its shadow and the histogram HV4 contains, after the edge of the shadow has been removed by means of threshold value discrimination, exclusively the edges belonging to the moving object.

After this elimination of the shadow edges, the actual moving object edges can very easily be found out in the edge gray-value images and also in the original images of the sequence of images, as a result of which a correct determination of the geometric dimensions of the moving objects is very simply possible.

In a preferred exemplary embodiment of the method according to the invention, the edge gray-value images are put into binary form before the determination of the edge histograms using standard methods for image processing. It is plausible that the quantity of data to be processed can be decisively reduced in this manner and that the calculation of the histograms from the images is simplified by this. A further advantage of putting into binary form is to be seen in a possible reduction of the influence of statistical noise processes, which can possibly be contained in the original image material.

In a further exemplary embodiment of the invention, carrying out steps, after the first step of determining a sequence of background images, is restricted to those image regions which correspond to moving objects - if appropriate including their shadow. Such image regions are marked in FIG. 5 as black regions. In a variant of the method according to the invention, instead of the image regions marked black in FIG. 5, the enclosing rectangles of these image regions can also be used.

In a preferred embodiment of the method according to the invention, shadow edges and/or object edges are tracked in time. By doing this, an improvement of the edge classification with a simultaneous reduction of the computational cost is possible. For this purpose, time series of horizontal or vertical edge histograms are formed, in which corresponding edges are identified and their movement tracked in the course of time. For this purpose, various methods for tracking objects in time series of images can be used, as they are known from the literature (for example W. Feiten et al., 1991).

In order to improve further the efficiency of the method and to reduce the computational cost as far as possible, a further preferred exemplary embodiment of the method according to the invention uses preknowledge about the occurrence and the lateral position of thrown shadows at object edges. For this purpose, a hierarchical system architecture is used which has typically three hierarchical levels. The highest processing level uses knowledge about the calendar date and the time to assess the possibility of the occurrence of thrown shadows. If therefore, because of the season or time of day, the occurrence of thrown shadows is excluded, the method omits a corresponding analysis. Otherwise, a processing level lying below said level analyzes the moving objects with respect to typical attributes, such as for example abnormal values for the object height or object width. In so doing, the expected shadow direction and lateral position and the probable shadow shape are used for improving the search for shadow edges in the vicinity of a detected object.

A third processing level, lying below these levels, ensures the processing of preknowledge which has been acquired by means of the analysis of images preceding in time, that is to say in an adaptive manner. Each shadow which has been detected in one of the preceding images has, with a larger probability, a successor in one of the following images. By means of a corresponding time tracking of shadow edges, the efficiency of the method can be considerably increased.

In the tracking of the objects through the time series of digital images, their positions are precomputed for future instants. In this arrangement, the following object properties, inter alia, are recorded:

instantaneous position predicted position in a future image instantaneous speed predicted speed in a future image object width and a plausibility.

For tracking geometric object properties, spatial coordinates are preferably used (in contrast to image coordinates) in this case. The object dimensions are preferably recorded with the aid of circumscribing rectangles. For the time tracking of all attributes and parameters, Kalman filters are preferably used.

A correct separation of the shadows from the corresponding objects requires the use of knowledge about the shadow direction, which results from the calendar date, the time and from geometrical influencing variables of the highway traffic scene. For instance, if it is known that the shadows lie on the right-hand sides of the moving objects, the edge extraction begins on this side of a segment and generates the corresponding edge histograms.

After the shadows have been separated from the objects, the object geometry (for example width, height) can be accurately determined and an object description can be established. From the determined shadow direction, the geometrical relationships of the highway traffic scene can be determined and used to improve following processing steps.

Finally, various parameters of the method and the image-producing hardware can be optimized and adjusted, taking into account the fact that the vehicles are rigid objects.

In this description, the following publications have been cited:

G. D. Sullivan, K. D. Baker: Model-based vision: using cues to select hypotheses. SPIE Vol. 654 Automatic Optical Inspection (1986), pp. 272–277

W. Feiten et al.: A video-based system for extracting traffic flow parameters, Proc. 13th DAGM 1991, Munich, pp. 507–514

K. P. Karmann, A. v. Brandt: Moving object segmentation based on adaptive reference images, Proc. of EUSIPCO 1990, Barcelona Y. Shirai, Three-Dimensional computer vision, Springer Verlag, 1987

The present description is followed by listings of computer programs or program modules which can be used for carrying out the method described above on an electronic computing system.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

Appendix

```
/************************************************
****************/
/*
*/
/*      shadow analysis
*/
/*
*/
/*      file      :   p_clust.c
*/
/*      translate :   intermetrics c compiler
*/
/*      author    :   Michael Kilger
*/
/*      version   :   1.0, 14/07/92
*/
/*
*/
/************************************************
****************/

/************************************************
****************/
/*      includes
*/
/************************************************
****************/ include <stddef.h>
include <stdlib.h>
#include "common.h"
#include "macrodsp.h"

/************************************************
****************/
/*      definess
*/
/************************************************
****************/ define ANALYSESTART    100000.0F           /* start of the clusteranalysis
                                               in ANALYSESTART mm form the
                                               camera    */
#define ANALYSESOUTH    50000.0F
#define MAXWIDTH    2500.0F                 /*
maximum accepted width of a                    vehicle   */
#define XSHADET     7                       /* account
of pixels in x direction            for reject shadowanalysis
        */
```

12

```
     #define YSHADET       7              /* account
     of pixels in y direction
                                     for reject shadowanalysis
     */
  5  #define SHADELAY     30              /* account
     of cycles, which the
                                     shadowanalysis continues,
     if no
                                     shadow is detected
 10  */
     #define MINWIDTH      3
     #define TSTSHADELAY  20
     #define CNTSTH       20
     #define SHAPROP      60.0F
 15  #define SOUTHPROP    60.0F extern  void toworld ( void );
     extern  int   Hconvolve( int, int);
     extern  int   Vconvolve( int, int);
 20  extern  int   Hcondispl( int, int);
     /***********************************************************
     ****************/
     /*      extern variables
 25  */
     /***********************************************************
     ****************/ extern long OutBuf[];
 30  extern long SegLin[];
     extern long WorkBuf[];
     extern long BgBuf[];
     extern struct segm SegList[];
     extern long EdgThr;
 35  extern long EThr2;
     extern long Edofs;

extern int     segs;
     extern long    sha,lscycl;
 40  extern long    West,East,North,South;
     extern int     debug;

/***********************************************************
 45  ****************/
     /*      function prototypes
     */
     /***********************************************************
     ****************/
 50
     int    Shadow( void );
     int    Cluster( void );
     int    shadowanalysis( void );
     int    isshadow( int *, int *);
 55  int    occlusionanalysis ( int );
```

13

```
     int    Shadow( void )
     {
 5       int            i;
         int            tst;
         static int     tstsouth=1;
         static int     tstcntsth=0;
         static int     south=0;
10       int            s=0;
         int            checked=0;

if (sha){
15           toworld();

if (tstsouth){
                 for (i=1; i<=segs; i++){
                     if (SegList[i].next == NULL){
20                       if(SegList[i].Y < ANALYSESOUTH &&
     SegList[i].dp != 255 && SegList[i].rp != 255 &&
     SegList[i].lp != 0) {
                             checked++;
                             if(Hcondispl(SOUTH,i)) s++;
25                       }
                     }
                 }
                 if (s){
                     south++;
30               }
                 if (checked){
                     tstcntsth++;
                 }
                 if (tstcntsth > CNTSTH){
35                   if ((float)south/(float)CNTSTH*100.0F >
     SOUTHPROP){
                         South = 1;
                     }
                     tstsouth = 0;
40               }
             } if (debug){
             send32bit(tstsouth);
45          send32bit(checked);
             send32bit(tstcntsth);
             send32bit(south);
             send32bit(s);
             }
50 if((tst = shadowanalysis()) == -1){
55               return(-1);
             }
```

```
                                    14
              else if (tst == 0){
                   lscycl = 0;
                   return(0);
              }
              else{
                   lscycl++;
                   if (lscycl > SHADELAY){
                        sha = West = East = South = 0;
                        tstsouth = 1;
                        tstcntsth = south = 0;
                   }
              }
         }
         else{
              if(debug){
                   send32bit(-3);
                   send32bit(-3);
                   send32bit(-3);
                   send32bit(-3);
                   send32bit(-3);
              }
         } return(tst);
    }
    /*****************************************************************
    ****************/
    /*       Cluster()
    */
    /*
    */
    /*       input:  none
    */
    /*       output: int
    */
    /*              0       no cluster detected
    */
    /*              1       cluster detected and segment
    outlines changed       */
    /*
    */
    /*****************************************************************
    ****************/ int     Cluster( void )
    {
         int       i;
         int       clanalyse;
         int       shanalyse;
         int       w,e;
         static int     west = 0;
         static int     east = 0;
         static int     tstcnt = 0;
         static int     tstsha = 0;
```

15

```
    /******************************************************
    /
    /*      send32bit(tstsha); */
5   /*      send32bit(tstcnt); */
    /******************************************************
    /
        clanalyse = shanalyse = w = e = 0;
        for (i=1; i<=segs; i++){
10          if (SegList[i].next == NULL){
                if(SegList[i].Y < ANALYSESTART &&
    SegList[i].Width > MAXWIDTH){
                    clanalyse=1;
                    if((!sha) && (!tstsha)){
15                      shanalyse = 1;
                    }
                    else{
                        shanalyse = 0;
                    }
20                  break;
                }
            }
        }

25      if (tstsha){
            clanalyse = 1;
            if (isshadow(&w,&e)){ tstcnt++;
30
                if (w > e)              west++;
                else if (e > w)         east++;

if (tstcnt > TSTSHADELAY){
35                  if (west > east){
                        if (((float)west /
    (float)TSTSHADELAY)*100.0F > SHAPROP){
                            sha = 1;
                            West = 1;
40                      }
                    }
                    else if (east > west){
                        if (((float)east /
    (float)TSTSHADELAY)*100.0F > SHAPROP){
45                          East = 1;
                            sha = 1;
                        }
                    }
                    lscycl = 0;
50                  tstcnt = 0;
                    west = 0;

east = 0;
                    tstsha = 0;
55              }
```

```
                        }

}
                if(shanalyse){
                        if (tstsha = isshadow(&w,&e)){
                                clanalyse = 1;
                                tstcnt = 1;
                                if (w > e){
                                        west = 1;
                                        east = 0;
                                }
                                else if (e > w){
                                        east = 1;
                                        west = 0;
                                }
                                else{
                                        east = 0;
                                        west = 0;
                                }
                        }
                } if(debug){
                send32bit(tstsha);
                send32bit(tstcnt);

send32bit(w);
                send32bit(e);

send32bit(west);
                send32bit(east);
                } return(clanalyse);
}
/********************************************************
****************/
/*      isshadow()
*/
/*
*/
/*      input:  addresses of the west and east varibles in
Cluster()       */
/*      output: update of the east and west variables
*/
/*              1       shadow detected
*/
/*              0       no shadow detected
*/
/*
*/
/********************************************************
****************/
```

17

```
       int    isshadow( int *ws, int *es )
       {
           int i,we,ea;
 5
           we = ea = 0;
           for (i=1; i<=segs; i++){
               if (SegList[i].next == NULL){
                   if(SegList[i].Y < ANALYSESTART){
10                     if(Vconvolve(WEST,i))   we++;
                       if(Vconvolve(EAST,i))   ea++;
                   }
               }
           }
15         *ws = we;
           *es = ea;

if (we || ea)        return(1);
           return(0);
20  }
    /***********************************************************
    ****************/

25  int    shadowanalysis( void )
    {
        int i;
        int    shadetected,checked;

30      shadetected = checked = 0;

for (i=1; i<=segs; i++){
            if (SegList[i].next == NULL){
                if(SegList[i].Y < ANALYSESTART){
35                  checked = 1;
                    if (West)
    if(Vconvolve(WEST,i))   shadetected++;
                    if (East)
    if(Vconvolve(EAST,i))   shadetected++;
40                                          if (South)
    if(Hcondispl(SOUTH,i) && !West && !East)
    shadetected++;
                }
            }
45      } if (checked)    return(shadetected);
        else            return(-1);

50  }

/***********************************************************
    ****************/
55
```

```
/*       EOF      */

/******************************************************************
   ***************/
/*
*/
/*       low-level routines
*/
/*
*/
/*       file      :  d_llevel.c
*/
/*       translate :  intermetrics c compiler
*/
/*       author    :  Michael Kilger
*/
/*       version   :  1.0, 04/08/92
*/
/*
*/
/******************************************************************
***************/

/******************************************************************
***************/
/*       includes
*/
/******************************************************************
***************/ include <stddef.h>
include <stdlib.h>
#include "common.h"
#include "macrodsp.h"

/******************************************************************
***************/
/*       defines
*/
/******************************************************************
***************/ extern  void toworld ( void );
int     Hcondispl( int, int);

/******************************************************************
***************/
/*       extern variables
*/
/******************************************************************
***************/
```

19

```
    extern long OutBuf[];
    extern long SegLin[];
    extern long WorkBuf[];
    extern long BgBuf[];
 5  extern struct segm SegList[];
    extern long EdgThr;
    extern long EThr2;
    extern long Edofs;

10  extern int    segs;
    extern long   sha,lscycl;
    extern long   West,East,North,South;
    extern int    debug;

15  /***********************************************************
    ****************/
    /*      function prototypes
    */
20  /***********************************************************
    ****************/ int    Hconvolve( int , int );
    int    Vconvolve( int , int );
25

/***********************************************************
    ****************/

30  int    Hconvolve( int dir, int nr )
    {
        int     lp,rp,dp,up;                        /* coord.
    of the segment */
        int     xwidth,ywidth;                      /* width
35  and height of the s. */
        int     x,y;                                /* loop
    counter       */
        int     t1,t2;                              /* help
    variables     */
40      long    *ConvBuf1,*ConvBuf2,*ShowBuf;       /*
    convolve buffers    */
        int     d;                                  /*
    direction     */
        long    edgsum,edgsum1,edgsum2;             /* help
45  variables     */
        int     Edg;                                /* edge
    threshold     */
        int     edge=1;

50
        if (SegList[nr].lp > 0)          lp =
    (int)SegList[nr].lp;    /* calculate */
        else                             lp = 1;
    /* the start */
55                                                  /* line and */
```

20

```
        if (SegList[nr].rp < X_INT)      rp =
(int)SegList[nr].rp;    /* pixel       */
        else
                                         rp = X_INT-1;
5       if (SegList[nr].up > 0)          up =
(int)SegList[nr].up;
        else
                                         up = 1;

if (SegList[nr].dp < Y_INT)      dp =
10 (int)SegList[nr].dp;
        else
                                         dp = Y_INT-1;

xwidth = rp-lp+1;                           /* width
and height of the segment */
15      ywidth = dp-up+1;                           /* in
pixels                         */

Edg = xwidth/10L + Edofs;                   /* linear
function to determine the
20                                       significance for the
first edge   */ if (dir == SOUTH){                          /* obtain
the two convolve buffers */
25          ConvBuf1 = WorkBuf + lp + dp*X_INT;     /*
(current image and back-  */
            ConvBuf2 = BgBuf +lp + dp*X_INT;        /*
ground image) for each   */
            ShowBuf = OutBuf + lp + dp*X_INT;       /*
30 direction (west and east) */
            d = -1;
        }
        else if( dir == NORTH){
            ConvBuf1 = WorkBuf + lp + up*X_INT;
35          ConvBuf2 = BgBuf + lp +up*X_INT;
            ShowBuf = OutBuf + lp + up*X_INT;
            d = 1;
        }

40      for ( y=0; abs(y)<=ywidth; y+=d){
            edgsum1 = edgsum2 = 0;
            for (x=0; x<=xwidth; x++){
                t1 = (1) *  *(ConvBuf1 + x-1 + (y-1)*X_INT)
      +  /* convolve */
45                   (2) *  *(ConvBuf1 + x + (y-1)*X_INT) +
/*  1  2  1 */
                     (1) *  *(ConvBuf1 + x+1 + (y-1)*X_INT) +
/*  0  0  0 */
                     (0) *  *(ConvBuf1 + x-1 + y*X_INT) +
50 /* -1 -2 -1 */
                     (0) *  *(ConvBuf1 + x + y*X_INT) +
                     (0) *  *(ConvBuf1 + x+1 + y*X_INT) +
                     (-1) * *(ConvBuf1 + x-1 + (y+1)*X_INT)
      +
                     (-2) * *(ConvBuf1 + x + (y+1)*X_INT) +
55                   (-1) * *(ConvBuf1 + x+1 + (y+1)*X_INT);
```

21

```
            t2 =   (1) *  *(ConvBuf2 + x-1 + (y-1)*X_INT)
      +
                   (2) *  *(ConvBuf2 + x   + (y-1)*X_INT) +
                   (1) *  *(ConvBuf2 + x+1 + (y-1)*X_INT) +
 5                 (0) *  *(ConvBuf2 + x-1 + y*X_INT) +
                   (0) *  *(ConvBuf2 + x   + y*X_INT) +
                   (0) *  *(ConvBuf2 + x+1 + y*X_INT) +
                  (-1) *  *(ConvBuf2 + x-1 + (y+1)*X_INT)
      +
10                (-2) *  *(ConvBuf2 + x   + (y+1)*X_INT) +
                  (-1) *  *(ConvBuf2 + x+1 + (y+1)*X_INT);
            if ((t1) > EdgThr)    t1 = 1;
            else                  t1 = 0;
15          if ((t2) > EdgThr)    t2 = 1;
            else                  t2 = 0;

edgsum1 += t1;                              /* add
20    the edge greyvalues */
            edgsum2 += t2;
        }
        edgsum = edgsum1 - edgsum2;          /*
      subtract the edge greyvalues
25                                           of the background from
      those
                                             of the current image
      */
        if ((edgsum) > Edg){                 /* if the
30    resulting edge grey-
                                             value is greater than a
      threshold
                                             it is assumed that it
35    is a
                                             significant edge of the
      vehicle */
            if (edge){
                if (abs(y)<YSHADET)     return(0);
40              if (dir == SOUTH){
                    SegList[nr].dp = dp + y + 1;
                    SegList[nr].norm = 4;
                }
                else if (dir == NORTH){
45                  SegList[nr].up = up + y;
                    SegList[nr].norm = 3;
                }
                return(1);
            }
50          else{
                edge = 1;
            }

}
55      else{
            edge = 0;
```

22

```
                }
          }
5         return(0);
     }
     /*************************************************************
10   ****************/
     int     Vconvolve( int dir, int nr )
     {
          int     lp,rp,dp,up;
15        int     xwidth,ywidth;
          int     x,y;
          int     t1,t2;
          long    *ConvBuf1,*ConvBuf2;
          int     d;
20        long    edgsum,edgsum1,edgsum2;
          int     Edg;
          int     edge = 0;

if (SegList[nr].lp > 0)       lp =
25        (int)SegList[nr].lp;
          else                          lp = 1;

if (SegList[nr].rp < X_INT)   rp =
          (int)SegList[nr].rp;
30        else                          rp = X_INT-1;

if (SegList[nr].up > 0)       up =
          (int)SegList[nr].up;
          else                          up = 1;
35
          if (SegList[nr].dp < Y_INT)   dp =
          (int)SegList[nr].dp;
          else                          dp = Y_INT-1;

40        xwidth = rp-lp+1;
          ywidth = dp-up+1;

Edg = ywidth/EThr2 + Edofs;

45        if (dir == EAST){
               ConvBuf1 = WorkBuf + lp + up*X_INT;
               ConvBuf2 = BgBuf + lp + up*X_INT;
               d = 1;
          }
50        else if( dir == WEST){
               ConvBuf1 = WorkBuf + rp + up*X_INT;
               ConvBuf2 = BgBuf + rp + up*X_INT;
               d = -1;
          }
55
```

23

```
        for ( x=0; abs(x)<=xwidth-MINWIDTH; x+=d){
            edgsum1 = edgsum2 = 0;
            for (y=0; y<=ywidth; y++){
                t1 =    (1) *  *(ConvBuf1 + x-1 + (y-1)*X_INT)
    +
                        (0) *  *(ConvBuf1 + x   + (y-1)*X_INT) +
                        (-1) * *(ConvBuf1 + x+1 + (y-1)*X_INT)
    +
                        (2) *  *(ConvBuf1 + x-1 + y*X_INT) +
                        (0) *  *(ConvBuf1 + x   + y*X_INT) +
                        (-2) * *(ConvBuf1 + x+1 + y*X_INT) +
                        (1) *  *(ConvBuf1 + x-1 + (y+1)*X_INT) +
                        (0) *  *(ConvBuf1 + x   + (y+1)*X_INT) +
                        (-1) * *(ConvBuf1 + x+1 + (y+1)*X_INT);
                t2 =    (1) *  *(ConvBuf2 + x-1 + (y-1)*X_INT)
    +
                        (0) *  *(ConvBuf2 + x   + (y-1)*X_INT) +
                        (-1) * *(ConvBuf2 + x+1 + (y-1)*X_INT) +
1)*X_INT) +
                        (2) *  *(ConvBuf2 + x-1 + y*X_INT) +
                        (0) *  *(ConvBuf2 + x   + y*X_INT) +
                        (-2) * *(ConvBuf2 + x+1 + y*X_INT) +
                        (1) *  *(ConvBuf2 + x-1 + (y+1)*X_INT)
    +
                        (0) *  *(ConvBuf2 + x   + (y+1)*X_INT) +
                        (-1) * *(ConvBuf2 + x+1 +
(y+1)*X_INT);

if (abs(t1) > EdgThr)   t1 = 1;
                else                    t1 = 0;
                if (abs(t2) > EdgThr)   t2 = 1;
                else                    t2 = 0;

edgsum1 += t1;
                edgsum2 += t2;
            } edgsum = edgsum1 - edgsum2;
            if (edgsum > Edg){
                if (edge){
                    if (abs(x)<XSHADET){
                        return(0);
                    }
                    if (dir == EAST){
                        SegList[nr].lp = lp + x - 1;
                    }
                    else if (dir == WEST){
                        SegList[nr].rp = rp + x + 1;
                    }
                    return(1);
                }
                else{
                    edge = 1;
                }
            }
```

```
                            24
            else    edge=0;
        }

SegList[nr].norm = 5;
5       return(0);

}

10  /*************************************************************
    ****************/ int    Hcondispl( int dir, int nr )
    {
15
        int     xwidth,ywidth;
        int     x,y;
        int     t1,sobbg;
        long    *ConvBuf1,*ConvBuf2,*ShowBuf;
20      int     d;
        long    edgsum,edgsum1,edgsum2;
        int     Edg;
        int     edge = 0;
        long    EdgHist[256];
25      int     back=0;

xwidth = SegList[nr].rp-SegList[nr].lp+1;
        ywidth = SegList[nr].dp-SegList[nr].up+1;
30
        Edg = xwidth/10 + Edofs;

if (dir == SOUTH){
            ConvBuf1 = WorkBuf + SegList[nr].lp +
35  SegList[nr].dp*X_INT;
            ConvBuf2 = BgBuf + SegList[nr].lp +
    SegList[nr].dp*X_INT;
            ShowBuf = OutBuf + SegList[nr].lp +
    SegList[nr].up*X_INT;
40          d = -1;
        }
        else if( dir == NORTH){
            ConvBuf1 = WorkBuf + SegList[nr].lp +
    SegList[nr].up*X_INT;
45          ConvBuf2 = BgBuf + SegList[nr].lp
    +SegList[nr].up*X_INT;
            ShowBuf = OutBuf + SegList[nr].lp +
    SegList[nr].up*X_INT;
            d = 1;
50      } for ( y=0; abs(y)<=ywidth; y+=d){
            edgsum1 = edgsum2 = 0;
55          for (x=0; x<=xwidth; x++){
                t1 =   (1) *   *(ConvBuf1 + x-1 + (y-1)*X_INT) +
```

```
                        25
                  (2) *  *(ConvBuf1 + x   + (y-1)*X_INT) +
                  (1) *  *(ConvBuf1 + x+1 + (y-1)*X_INT) +
                  (0) *  *(ConvBuf1 + x-1 + y*X_INT) +
                  (0) *  *(ConvBuf1 + x   + y*X_INT) +
                  (0) *  *(ConvBuf1 + x+1 + y*X_INT) +
                  (-1) * *(ConvBuf1 + x-1 + (y+1)*X_INT) +
                  (-2) * *(ConvBuf1 + x   + (y+1)*X_INT) +
                  (-1) * *(ConvBuf1 + x+1 + (y+1)*X_INT);
         sobbg =  (1) *  *(ConvBuf2 + x-1 + (y-1)*X_INT)
              +
                  (2) *  *(ConvBuf2 + x   + (y-1)*X_INT) +
                  (1) *  *(ConvBuf2 + x+1 + (y-1)*X_INT) +
                  (0) *  *(ConvBuf2 + x-1 + y*X_INT) +
                  (0) *  *(ConvBuf2 + x   + y*X_INT) +
                  (0) *  *(ConvBuf2 + x+1 + y*X_INT) +
                  (-1) * *(ConvBuf2 + x-1 + (y+1)*X_INT) +
                  (-2) * *(ConvBuf2 + x   + (y+1)*X_INT) +
                  (-1) * *(ConvBuf2 + x+1 + (y+1)*X_INT);

if ((t1) > EdgThr)    t1 = 1;
         else                  t1 = 0;

if ((sobbg) > EdgThr)    sobbg = 1;
         else                        sobbg = 0;

edgsum1 += t1;
         edgsum2 += sobbg;

}
      edgsum = edgsum1 - edgsum2;
      EdgHist[abs(y)] = edgsum;
   } for (y=0; y<=ywidth; y++){
      if(EdgHist[y] > Edg){
         if (edge){
            if (y<YSHADET){
               break;
            }
            SegList[nr].dp -= y;
            SegList[nr].dp += 3;
            back = 1;
            break;
         }
         else{
            edge = 1;
         }
      }
      else{
         edge = 0;
      }
   }
   return(back);
```

```
                    }
           /*      EOF      */
    5

/*****************************************************
           ****************/
           /*
   10      */
           /*      Routine to filter the tracking with a kalman filter
           */
           /*      Calculation of histograms is added
           */
   15      /*      Functions of mathsys.c are included
           */
           /*
           */
           /*      Author: Michael Kilger
   20      */
           /*
           */
           /*      Version 1.0:    19.9.1992
           */
   25      /*
           */
           /*****************************************************
           ****************/

30
           #include "common.h"
           #include <stdio.h>
           #include <math.h>
           #include    <malloc.h>
   35      #include    <stdlib.h> include "kalman.h"

define MINDIST 20000
   40      #define MINDIST_S 1200
           #define MAXMALUS        1
           #define MAXDIST         10000

45      extern int sys_times(float *, float *, float *);
           extern void sys_plus(float *, float *, float *);
           extern void sys_minus(float *, float *, float *);
           extern void transpose(float *,float *);
           extern void invert2(float *, float *);
   50

/*prototypes */
           unsigned char create_track(struct sgmlst *,trp *,int *);
           unsigned char remove_track(trp *);
   55      int initialize_kalman( void );
```

```
        void kalman(trp );
        void assign_sgmt(struct sgmlst **,trp *,int *);
        void assign( trp );

5      /**************************************************
        ***/
        unsigned char create_track(struct sgmlst *curseg,trp
        *traclst,int *track_count)                              */
10      /* creates a new track with track number                */
        /* and inserts it at the begin of traclst.              */

{
        int     i;      /*auxiliary variable*/
15          trp  new;
            if((new = (struct track *)malloc(sizeof( struct
        track))) == NULL){
                    printf("allocation error - aborting");
                    exit( 0 );
20          }
            new->X_meas = curseg->X;
            (*new).Y_meas = curseg->Y;
            new->Width = curseg->Width;
            (*new).X_hat = curseg->X;
25          (*new).Y_hat = curseg->Y;
            (*new).Xdot_hat = 0.;
            (*new).Ydot_hat = 0.;
            (*new).X_tilde = curseg->X;
            (*new).Y_tilde = curseg->Y;
30          (*new).Xmeas_tilde = curseg->X;
            (*new).Ymeas_tilde = curseg->Y;
            (*new).number = *track_count;
            (*new).malus = 0;
            (*new).count = 1;
35          (*new).class = 0;
            (*new).ass = 0;
            (*new).corr_sgmt = curseg;
            (*new).next = (*traclst);
            (*traclst) = new;
40          *track_count += 1;

return( 1 );
         }

45      /**************************************************
        ***/
        unsigned char remove_track(trp *traclst)
        {
50      trp     obsolete, curtrack, curtrack1;

#if DEBUG
        FILE    *fp;

55          fp = fopen("track.lst","a++");
        #endif
```

28

```
       for (curtrack = (*traclst); curtrack != NULL;) {
            if (((*curtrack).malus > MAXMALUS) ) {
                obsolete = curtrack;
                curtrack = (*curtrack).next;
 5              if (curtrack == NULL){
                    (*traclst) = NULL;
                }
                #if DEBUG
                fprintf(fp,"No: %d\n  count = %d,  class =
10 %d\n",obsolete->number,obsolete->count,obsolete->class);
                fprintf(fp,"X_hat   = %6.2fm,Y_hat   =
%6.2fm,Width = %6.2fm\n",obsolete->X_hat/1000,obsolete-
>Y_hat/1000,obsolete->Width/1000);
                fprintf(fp,"X_meas  = %6.2fm,Y_meas  =
15 %6.2fm\n",obsolete->X_meas/1000,obsolete->Y_meas/1000);
                fprintf(fp,"X_tilde = %6.2fm,Y_tilde =
%6.2fm\n\n\n",obsolete->X_tilde/1000,obsolete-
>Y_tilde/1000);
                #endif
20              free(obsolete);
            }
            else {
                (*traclst) = curtrack;
                break;
25          }
        } for (curtrack = (*traclst); curtrack != NULL;) {
            for (curtrack1 = (*curtrack).next; curtrack1 !=
30 NULL;) {
                if (((*curtrack1).malus > MAXMALUS) ){
                    obsolete = curtrack1;
                    curtrack1 = (*curtrack1).next;
                #if DEBUG
35              fprintf(fp,"No: %d\n  count = %d,  class =
%d\n",obsolete->number,obsolete->count,obsolete->class);
                fprintf(fp,"X_hat   = %6.2fm,Y_hat   =
%6.2fm,Width = %6.2fm\n",obsolete->X_hat/1000,obsolete-
>Y_hat/1000,obsolete->Width/1000);
40              fprintf(fp,"X_meas  = %6.2fm,Y_meas  =
%6.2fm\n",obsolete->X_meas/1000,obsolete->Y_meas/1000);
                fprintf(fp,"X_tilde = %6.2fm,Y_tilde =
%6.2fm\n\n\n",obsolete->X_tilde/1000,obsolete-
>Y_tilde/1000);
45              #endif
                    free(obsolete);
                    if (curtrack1 == NULL){
                        (*curtrack).next = NULL;
                        break;
50                  }
                }
                else {
                    (*curtrack).next = curtrack1;
                    break;
55              }
```

```
                curtrack = curtrack1;
        }
#if DEBUG
        fclose(fp);
#endif
        return( 1 );
}

/*****************************************************************
***/
/*      initialize kalman matrices
*/
int initialize_kalman()
{
        float   aux2[18];
        int i,j;

for(i=0;i<4;i++){
                if(sys_times(measure,system_kal,ca_matr)){
                        printf("No correct matric
multiplication!\n");
                        exit(1);        /* constant update matrices
*/
                }
                if(sys_times(kalmang[i],ca_matr,aux2)){
                        printf("No correct matric
multiplication!\n");
                        exit(1);        /* akca_matr and kalmang */
                }
                sys_minus(system_kal,aux2,akca_matr[i]);
        }
        return 0;
}

/*****************************************************************
****/
void kalman(trp current_track)
{
/*              variables for kalman-filtering
*/ float           stateest[6],statepre[6],measpre[4],meas[4];
        float           kalman[10],varpre[18],aux1[18],aux2[18];
        float           aux3[10],aux4[10],aux5[6],aux6[6],aux7[4];
        float           aux8[6];

stateest[0]     =       4.0F;
        stateest[1]     =       1.0F;
        stateest[2]     =       (float)(*current_track).X_hat;
        stateest[3]     =       (float)(*current_track).Y_hat;
        stateest[4]     =       (float)(*current_track).Xdot_hat;
        stateest[5]     =       (float)(*current_track).Ydot_hat;

meas[0] =       2.0F;
```

```
    meas[1] =       1.0F;
    meas[2] =       (float)(*current_track).X_meas;
    meas[3] =       (float)(*current_track).Y_meas;

sys_times(system_kal,stateest,statepre);      /*
predicted states at time t   */
    sys_times(measure,statepre,measpre);     /* predicted
measurement at time t */ transpose(system_kal,aux1);
    sys_times(variance,aux1,aux2);
    sys_times(system_kal,aux2,aux1);
    sys_plus(aux1,sysn1,varpre);     /* predicted variance
at time t */ transpose(measure,aux3);
    sys_times(varpre,aux3,aux4);
    sys_times(measure,aux4,aux5);
    sys_plus(aux5,measn1,aux6);
    invert2(aux6,aux5);
    sys_times(aux3,aux5,aux4);
    sys_times(varpre,aux4,kalman);   /* Kalman gain at time
t        */ sys_minus(meas,measpre,aux7);
    sys_times(kalman,aux7,aux8);
    sys_plus(statepre,aux8,stateest);      /* with
measurement corrected state variables   */ sys_times(measure,varpre,aux3);
    sys_times(kalman,aux3,aux1);
    sys_minus(varpre,aux1,variance); /* variance at time t
*/

(*current_track).X_hat = stateest[2];
    (*current_track).Y_hat = stateest[3];
    (*current_track).Xdot_hat = stateest[4];
    (*current_track).Ydot_hat = stateest[5];

sys_times(system_kal,stateest,statepre);      /* predicted
    states at time t+1    */

(*current_track).X_tilde = statepre[2];
    (*current_track).Y_tilde = statepre[3];
    }

/*******************************************************
*****/
void assign_sgmt(struct sgmlst **seglst,trp *traclst,int
*track_count)
{
    trp             curtrack,curtrack1;
    struct sgmlst   *curseg;
    double          dist, maxx,maxy;
```

31

```
       int           assigned;
          for (curtrack = (*traclst);curtrack != NULL; curtrack =
       (*curtrack).next){
 5         curtrack->ass = -1;
           assigned = 0;

(*curtrack).diff = MINDIST;

10            for (curseg = (*seglst); curseg->next != NULL;
       curseg = (*curseg).next){
               maxx = fabs( curseg->X - (*curtrack).X_tilde);
               maxy = fabs( curseg->Y - (*curtrack).Y_tilde);
               dist = (maxx >= maxy) ? maxx : maxy;
15             if (dist < (*curtrack).diff){
                   assigned = 1;
                   (*curtrack).diff = (long)dist;
                   (*curtrack).corr_sgmt = curseg;
               }
20         } if( assigned == 0){
              (*curtrack).malus += 1;
25            curtrack->ass = -1;
              curtrack->X_meas = curtrack->X_tilde;
              curtrack->Y_meas = curtrack->Y_tilde;
       #if DEBUG
                printf("trackno. %d could not be assigned to a
30     segment\n",(*curtrack).number);
       #endif
           }
           else{
               if(curtrack->corr_sgmt->ass){
35             for (curtrack1 = (*traclst); curtrack1 !=
       curtrack; curtrack1 = curtrack1->next){
                   if (curtrack->corr_sgmt == curtrack1-
       >corr_sgmt){
                     if (curtrack->count > curtrack1->count){
40                       curtrack1->malus = MAXMALUS+1;
                         assign (curtrack);
                     }
                     else{
                         curtrack->malus = MAXMALUS+1;
45                   }
                     break;
                   }
               }
               }
50             else{
                 assign(curtrack);
               }
           }
       }
55
```

32

```
    for (curseg = (*seglst); curseg->next != NULL; curseg =
(*curseg).next){
        #if DEBUG
//        printf("curseg->Width:%f\n",curseg->Width);
        #endif
        if ( curseg->ass == 0 && curseg->Y < 300000.0 &&
curseg->Y > 50000.0){
            create_track(curseg,traclst,track_count);
            curseg->ass = 1;
        }
    } remove_track(traclst);

for (curtrack = (*traclst);curtrack != NULL; curtrack =
(*curtrack).next){
        kalman(curtrack);
    }
}
/****************************************************************
***************/ void    assign( trp curtrack)
{

(curtrack->count)++;
    curtrack->ass = 1;
    curtrack->corr_sgmt->ass = 1;
    curtrack->X_meas = curtrack->corr_sgmt->X;
    curtrack->Y_meas = curtrack->corr_sgmt->Y;
    curtrack->Width = curtrack->corr_sgmt->Width;
}

/* EOF */
```

What is claimed is:

1. A method for detecting and separating shadow of moving objects in a sequence of digital images, comprising the steps of:

a) determining a sequence of background images from the sequence of digital images, said sequence of background images containing only the non-moving image background of the sequence of images but not the moving objects;

b) determining, for extracting object edges, in each case an edge gray-value image for each image of the sequence of digital images and for each respective corresponding background image of the sequence of background images;

c) determining, by means of vertical or horizontal projection of said edge gray-value images, corresponding vertical or horizontal edge histograms in each case for the edge gray-value images;

d) eliminating edges which do not belong to moving objects or shadows, in that edge histograms of a background image are subtracted from corresponding edge histograms of an image, at a common instant in time, of the sequence of digital images, thereby forming differential edge histograms;

e) subjecting the differential edge histograms to a threshold value discrimination, to eliminate those edges which do not correspond to actual moving objects but which do correspond to a shadow of a moving object.

2. The method as claimed in claim 1, wherein the edge gray-value images are put into binary form before the determination of the edge histograms.

3. The method as claimed in claim 1, wherein, before carrying out steps b) to e) image regions are determined which correspond to moving objects and wherein steps b) to e) are applied only to these image regions.

4. The method as claimed in claim 1, wherein the method further comprises forming a time sequence of edge histograms from the edge histograms which belong to a common moving object, and improving elimination of shadow edges by identification and time tracking of corresponding edges.

5. The method as claimed in claim 1, wherein the method further comprises elimination of shadow edges by evaluating a preknowledge about a lateral position of the shadow edges with reference to corresponding object edges.

6. The method as claimed in claim 4, wherein the method further comprises elimination of shadow edges by evaluating a preknowledge about a lateral position of the shadow edges with reference to corresponding object edges, and wherein the preknowledge about the lateral position of the shadow edges is learned in an adaptive manner using the time sequence and is continuously checked.

* * * * *